United States Patent
Hawkins

(10) Patent No.: US 9,757,741 B2
(45) Date of Patent: Sep. 12, 2017

(54) THERMAL AND AUDIO CONTROLLED VALVE AND SHOWERHEAD ASSEMBLY

(71) Applicant: FAN FI INTERNATIONAL, INC., Reno, NV (US)

(72) Inventor: Travis Hawkins, Reno, NV (US)

(73) Assignee: FAN FI INTERNATIONAL, INC., Reno, NV (US)

( * ) Notice: Subject to any disclaimer, the term of this patent is extended or adjusted under 35 U.S.C. 154(b) by 0 days.

(21) Appl. No.: 14/853,534

(22) Filed: Sep. 14, 2015

(65) Prior Publication Data

US 2017/0072412 A1    Mar. 16, 2017

(51) Int. Cl.
| | |
|---|---|
| *E03C 1/00* | (2006.01) |
| *B05B 1/18* | (2006.01) |
| *B05B 12/00* | (2006.01) |
| *B05B 12/10* | (2006.01) |
| *F16K 37/00* | (2006.01) |
| *F16K 31/02* | (2006.01) |
| *F16K 31/04* | (2006.01) |
| *B05B 12/12* | (2006.01) |
| *B05B 1/00* | (2006.01) |
| *G05D 23/12* | (2006.01) |
| *B05B 1/30* | (2006.01) |

(52) U.S. Cl.
CPC ............... *B05B 1/185* (2013.01); *B05B 1/00* (2013.01); *B05B 12/004* (2013.01); *B05B 12/10* (2013.01); *B05B 12/12* (2013.01); *E03C 1/00* (2013.01); *F16K 31/025* (2013.01); *F16K 31/046* (2013.01); *F16K 37/0025* (2013.01); *G05D 23/123* (2013.01); *B05B 1/3013* (2013.01)

(58) Field of Classification Search
CPC ................... B05B 12/00; B05B 12/14; G05D 2219/2642; G05D 2219/23386; G05D 23/1393
USPC ............................ 239/69, 71, 73; 4/623, 625
See application file for complete search history.

(56) References Cited

U.S. PATENT DOCUMENTS

| | | | |
|---|---|---|---|
| 3,291,391 A * | 12/1966 | Mesco | F16K 17/386 137/625.28 |
| 5,368,227 A | 11/1994 | McGinnis | |
| 5,860,596 A | 1/1999 | Kolt | |
| 5,868,311 A * | 2/1999 | Cretu-Petra | E03C 1/057 236/12.12 |
| 6,405,939 B1 * | 6/2002 | Mazzenga | B05B 12/00 239/67 |
| 6,899,133 B2 * | 5/2005 | Brunkhardt | E03C 1/055 137/624.11 |
| 8,066,196 B2 | 11/2011 | McMurtry | |
| 8,132,778 B2 | 3/2012 | Connors | |
| 8,434,693 B2 | 5/2013 | Brown et al. | |
| 2006/0283973 A1 | 12/2006 | Bean, Jr. | |

(Continued)

*Primary Examiner* — Arthor O Hall
*Assistant Examiner* — Viet Le
(74) *Attorney, Agent, or Firm* — Russo & Duckworth, LLP; David G. Duckworth

(57) ABSTRACT

A valve for use with a showerhead assembly includes a housing having a threaded inlet for connecting to a water source and a distally located front face with nozzles. The nozzles are connected to the threaded inlet by a central conduit which is closeable by an electronically controlled valve. The valve is controlled by a processor which opens the valve based on temperature and audio signals above a predetermined decibel level.

8 Claims, 4 Drawing Sheets

(56) References Cited

U.S. PATENT DOCUMENTS

2008/0083893 A1\* 4/2008 Rubenstein ............. G10L 15/26
 251/129.04
2013/0341425 A1 12/2013 Peel \* cited by examiner

THERMAL AND AUDIO CONTROLLED VALVE AND SHOWERHEAD ASSEMBLY

BACKGROUND OF THE INVENTION

The present invention relates to water flow control valves. More particularly, the present invention relates to thermally controlled showerhead assemblies with manual overrides.

It is often necessary for a person to wait for a water source to reach a suitable temperature prior to use. For example, individuals will often turn on the hot water at their sink or shower and allow the water to run for an extended time period to allow the cold water to be expelled from the pipes. Unfortunately, individuals will sometimes allow the water to run an extended time period after the water has reached its desired temperature. For example, many individuals are reluctant to stand by a shower and continuously monitor the water temperature, and it is not uncommon for individuals to walk away from the sink or shower and then to become distracted by other tasks. This results in vast amounts of water and energy being wasted. Literally, significant amounts of hot water are simply lost down the drain.

Control valves have been developed for shutting off the water when the water reaches a predetermined temperature. For example, U.S. Pat. No. 3,291,391 describes a showerhead having a thermally responsive valve utilizing a bimetallic coiled strip which causes the valve to close upon the water reaching a desired temperature. Similarly, U.S. Pat. No. 5,368,227 describes a showerhead which includes a valve intended to stop the flow of water when water becomes dangerously hot.

More complicated electronic showerhead control valves have also been developed. U.S. Patent Application Publication No. 2013/0341425 describes a mixing valve including a hot water inlet and a cold water inlet. The valve is connected to an electronic controller and temperature sensor so as to control the valve to automatically blend the sources of water together to automatically dispense a desired water temperature. The electronic controller may include a microprocessor which is programmable to store different temperature profiles in memory. Still an additional electronic valve is described in U.S. Pat. No. 8,434,693. This valve assembly includes a temperature sensor and piston wherein the valve is closed at a preselected temperature. However, the closing of the valve can be overridden by a manual slide switch.

Unfortunately, each of the thermally controlled showerhead assemblies suffers from various drawbacks. For example, passive (non-electronically controlled) valve assemblies offer limited control for the user to adjust temperature. Meanwhile, electronically controlled valves for showerhead assemblies typically require operation of buttons or control knobs or the like to enable an individual to control the showerhead parameters.

Thus, it would be desirable to provide an improved showerhead assembly having a thermally controlled valve that was easier to operate.

SUMMARY OF THE INVENTION

The present invention addresses the aforementioned disadvantages by providing an improved showerhead assembly including a temperature limiting control valve which is manually controllable by sound above a predetermined decibel level. The showerhead assembly includes a conventional showerhead preferably including a female threaded inlet for affixing to a male threaded pipe which would typically extend from a shower stall wall. Alternatively, the showerhead assembly may be constructed as a handheld showerhead including a hollow elongate handle and a flexible rubber hose which connects to a water supply. For either of these embodiments, the showerhead assembly includes a housing having a front face including a plurality of nozzles for providing a spray pattern. The nozzles are connected to the showerhead assembly's inlet by one or more conduits which extend from the proximally located inlet to the distally located nozzles. The showerhead assembly may, or may not, possess a manual controller for allowing one to alter the flow of water through discrete pathways to provide different flow patterns. For example, a preferred showerhead may include a tab for allowing one to rotate the tab to different positions so as to obstruct or un-obstruct different conduits to divert the flow of water to different nozzles, such as to jet nozzles, wide spray nozzles and/or massage nozzles. Mechanisms for controlling the flow of water and/or spray patterns can be selected or developed by those skilled in the art without undue experimentation.

The showerhead assembly further includes an electronic control assembly for selectively activating or deactivating the flow of water through the showerhead. The electronic control assembly includes a valve, a temperature sensor, a microphone, a control processor and a power supply. The valve is electronically controlled and constructed so as to open and close the conduit so as to allow or obstruct the flow of water through the showerhead assembly. In a preferred embodiment, the valve includes an electric motor connected to a plunger whereupon rotation of the motor causes the plunger to project into and obstruct the conduit, or alternatively withdraw and un-obstruct the conduit.

The temperature sensor is thermally connected to the showerhead assembly's conduit so as to measure the temperature of water within the showerhead assembly's conduit. Preferably, the temperature sensor is a traditional thermistor which produces different resistance values, and accordingly different electrical signals, depending on the temperature of water within the conduit. The temperature sensor may be located within the conduit, or may be located to measure the temperature of the conduit itself which will vary in temperature depending upon water flowing through the conduit.

The showerhead assembly's microphone is positioned within the showerhead assembly, but positioned so as to receive sound from the ambient environment around the showerhead assembly, such as sounds within the shower stall. Traditional microphones for operation within a wet environment can be selected by those skilled in the art.

The control processor is connected to the valve, temperature sensor, and sound sensor for monitoring the electrical signals produced by the temperature sensor and sound sensor, and for controlling operation of the valve so as to open or close. Moreover, the control processor is programmed to open or close the valve dependent on various parameters including temperature measurements of water within the showerhead assembly's conduit, and dependent on sounds within the ambient vicinity of the showerhead assembly. Specifically, the processor is programmed to maintain the valve in an open condition upon an initial flow of water through the conduit, such as when an individual first turns on the water at a water supply valve. The processor maintains the shower assembly valve in an open condition until the water temperature reaches a predetermined temperature whereupon the processor transmits signals to the valve so as to close the valve.

Moreover, the processor is programmed to open the valve from a closed condition to permit the flow of water through the conduit upon receiving audio signals from the microphone indicating that a sound above a predetermined decibel has been detected by the microphone. Preferably, the processor is programmed to detect a clapping sound within the shower stall which triggers the valve to switch from a closed condition to an open condition. In a preferred embodiment, any sound above 75 decibels will be considered an indication that the showerhead user intends for the showerhead assembly valve to open so as to allow the user to take a shower.

In a more preferred embodiment, the processor is programmed to open the valve only upon a sound of 85 decibels or more having been detected by the microphone.

The valve and control processor are electrically connected to the showerhead assembly's power supply. The power supply may be determined by those skilled in the art including 120 volt or 220 volt power supply from a landline. More preferably, the power supply includes one or more batteries positioned within the showerhead assembly's housing. In a preferred embodiment, the power supply includes two "C" size batteries.

The showerhead assembly may include a single housing which includes the showerhead's front face and conduit for transporting water to the showerhead's nozzles. The showerhead's single housing also encapsulates the electronic controller's valve, temperature sensor, microphone, control processor and power supply. In an alternative embodiment, the showerhead assembly includes two housings which are connectable and disconnectable from one another such as by a threaded coupling. A first distal housing includes the showerhead's front face, a threaded inlet and a conduit for transporting water from the threaded inlet to the distally located nozzles. Meanwhile, the second housing includes the showerhead assembly's proximal inlet and a threaded outlet which threadably affixes to the first housing's threadable inlet. Moreover, the second housing encapsulates the valve, temperature sensor, microphone, processor and power supply.

In operation, a user will turn on a water supply so as to initially supply water to the showerhead assembly. The water supply will contain a mixture of hot water and cold water, but typically the initial flow of water will be unsatisfactory to the intended shower user due to cold water in the pipes. The showerhead assembly's control processor will monitor the temperature of the water through the showerhead assembly and maintain the valve in an open condition until the water has reached a predetermined temperature, such as 95° F. Upon the predetermined temperature being reached, the processor closes the valve so as to obstruct the flow of water to the showerhead assembly's nozzles. However, when the shower user intends to commence their shower, the user claps their hands to produce a sound above the predetermined decibel level preprogrammed within the processor so as to cause the processor to open the showerhead assembly valve resulting in a flow of water from the showerhead assembly's nozzles.

In a preferred embodiment, the processer also includes a timer which will restrict the length of one's shower to a predetermined time, such as 10 minutes. Once the user activates the flow of water through the showerhead by clapping their hands or making a noise above the predetermined threshold, the shower will continue for the predetermined time period. Thereafter, the flow of water and the user's shower will automatically stop by the processor automatically closing the showerhead assembly valve. Preferably, the user can override this feature by simply clapping their hands again or making another sound above the predetermined decibel level.

Accordingly, the showerhead assembly includes a thermally responsive valve which automatically stops the flow of water when a predetermined temperature is reached.

It is still an additional object of the invention to provide a showerhead assembly which allows a user to commence their shower without having to manually manipulate any buttons or knobs or the like.

Still an additional advantage of the showerhead assembly is to provide a control processor which will automatically limit the length of one's shower.

These and other more specific advantages of the showerhead assembly will be apparent to those skilled in the art from the following detailed description taken in conjunction with the drawings.

DETAILED DESCRIPTION OF THE INVENTION

Figure 1:
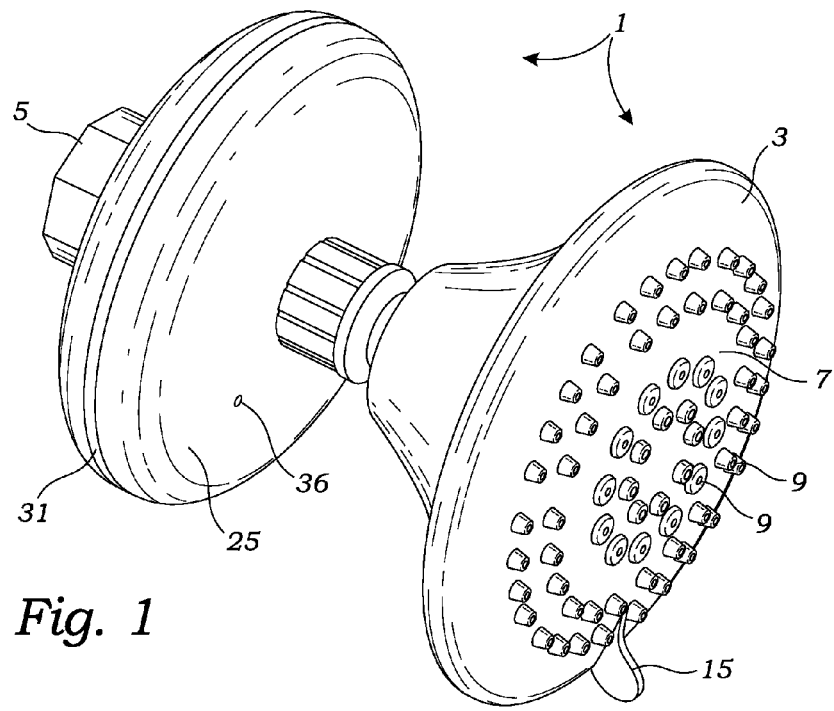
FIG. 1 is a front perspective view of the showerhead assembly of the present invention.

While the present invention is susceptible of embodiment in various forms, as shown in the drawings, hereinafter will be described the presently preferred embodiments of the invention with the understanding that the present disclosure is to be considered as an exemplification of the invention, and it is not intended to limit the invention to the specific embodiments illustrated.

With reference to all of the figures, the showerhead assembly 1 includes a threaded inlet 5 for connecting to a water source such as a male threaded pipe. In addition, the showerhead assembly includes a housing having a front face 7 formed with nozzles 9. The showerhead assembly's inlet 5 is connected to the nozzles 9 by one or more conduits 13 which traverse through the housing's central cavity. In a preferred embodiment, the showerhead assembly 1 includes a tab 15 for manually diverting water to different nozzles 9. Mechanisms for controlling the flow of water and/or the selection of spray patterns are well known to those skilled in the art and need not be illustrated in detail herein.

The showerhead assembly 1 further includes an electronic controller assembly 38 for controlling the flow of water through the showerhead assembly's conduit 13. The electronic controller assembly 38 may be located in the primary housing 3. In an alternative embodiment illustrated in FIGS. 1-3, the showerhead assembly 1 includes two housings including a first distal housing 3 and a second proximal housing 25 which are connectable and disconnectable from one another such as by a threaded coupling.

Preferably, the first distal housing 3 includes the showerhead's front face, a threaded inlet 19 and a conduit for transporting water from the threaded inlet 19 to the distally located nozzles 9. Meanwhile, the second housing 25 includes the showerhead assembly's proximal inlet 5 and a threaded outlet 35 which threadably affixes to the first housing's threadable inlet 19. Moreover, the second housing encapsulates the electronic controller assembly 38.

Figure 3:
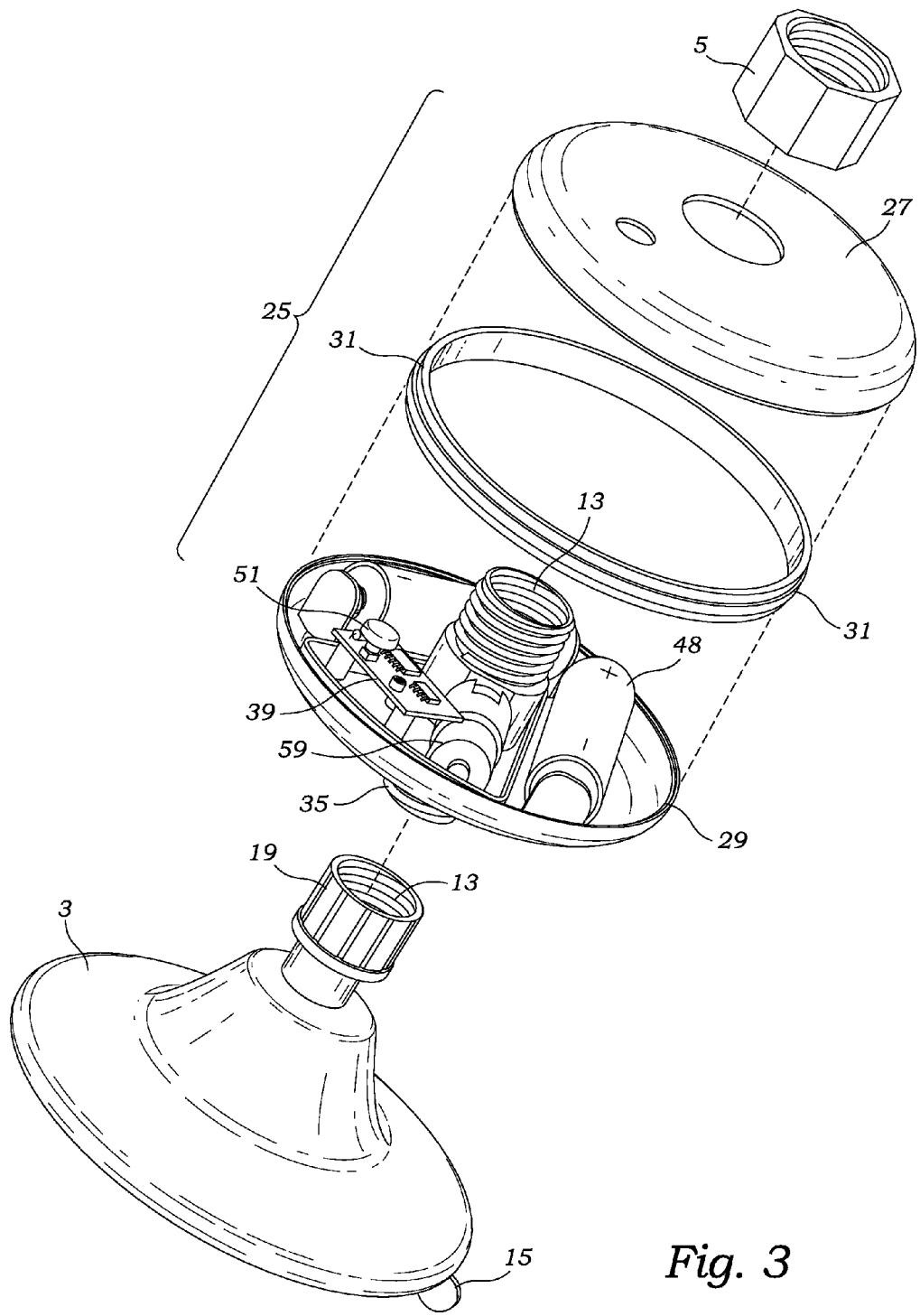
FIG. 3 is a rear perspective exploded view of the showerhead assembly of the present invention.
Figure 4:
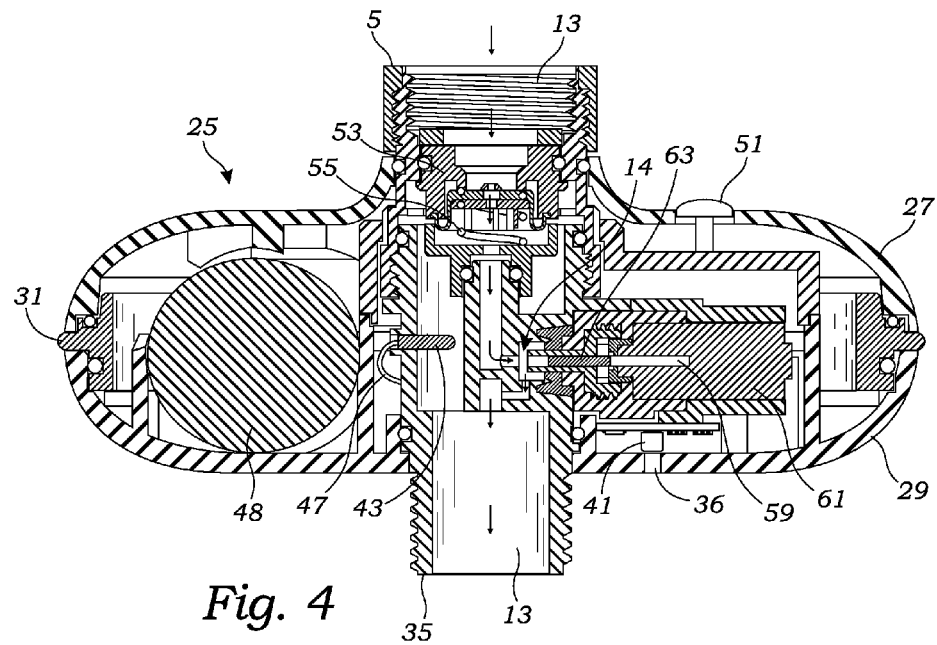
FIG. 4 is a side cutaway view of the electronic control assembly of the showerhead of the present invention illustrating the showerhead's central conduit in an open condition.
Figure 5:
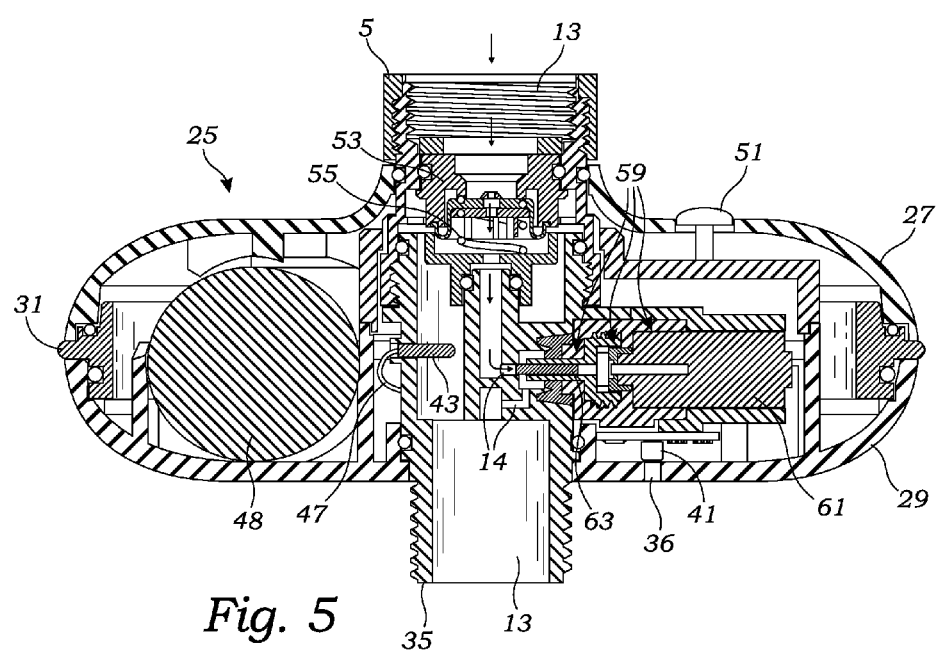
FIG. 5 is a side cutaway view of the electronic control assembly of the showerhead of the present invention illustrating the showerhead's central conduit in a closed condition.
Figure 6:
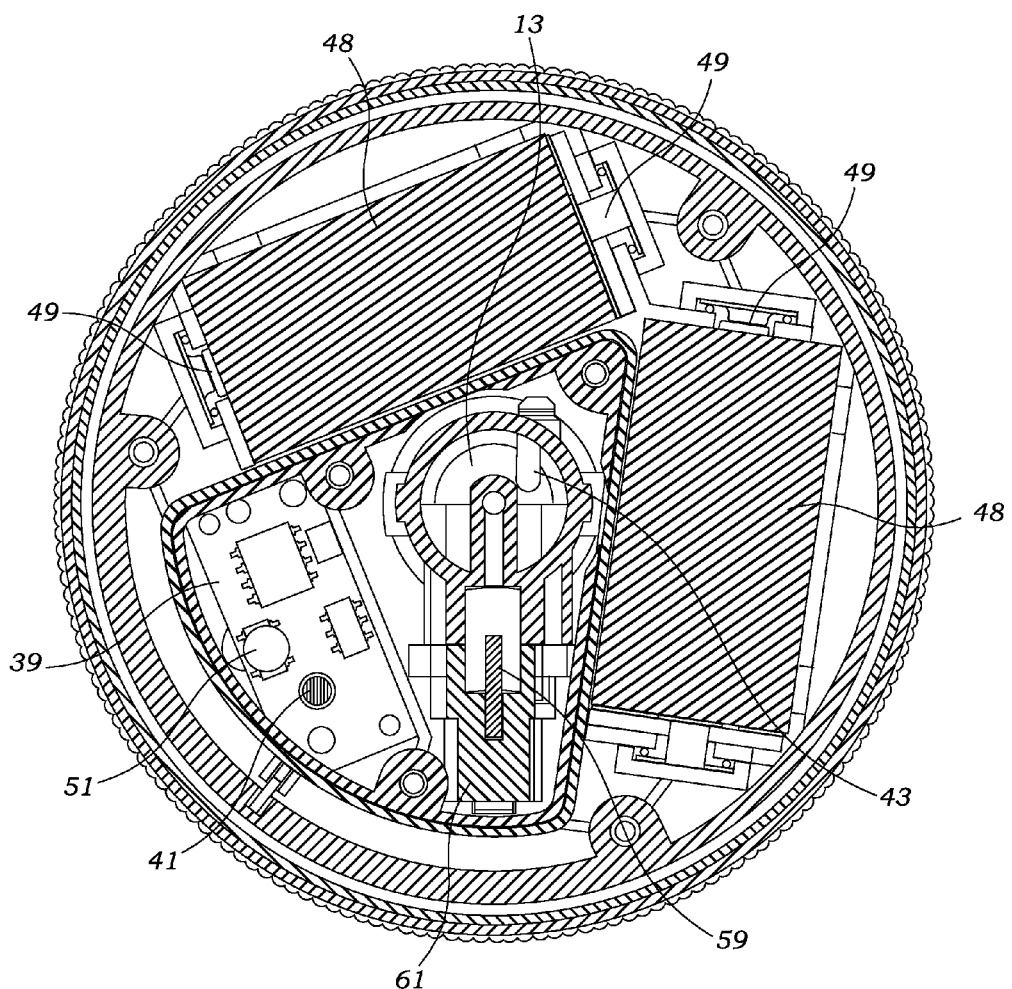
FIG. 6 is a top cutaway view of the control assembly for use with the showerhead assembly of the present invention.

As illustrated in FIG. 3, the second housing 25 is preferably constructed in a clamshell manner including a proximal clamshell piece 27 and a distal clamshell piece 29 which are joined together by a water tight washer 31. As illustrated in FIGS. 3, 4 and 5, the showerhead assembly's conduit 13 extends axially through the second housing 25 and is preferably constructed as a short pipe having threaded ends. Advantageously, the second housing 25 and integrated electronic controller assembly 38 can be utilized for purposes other than with a showerhead assembly. For example, the second housing 25 and electronic assembly 38 may be positioned upstream from a kitchen or bathroom faucet.

Figure 2:
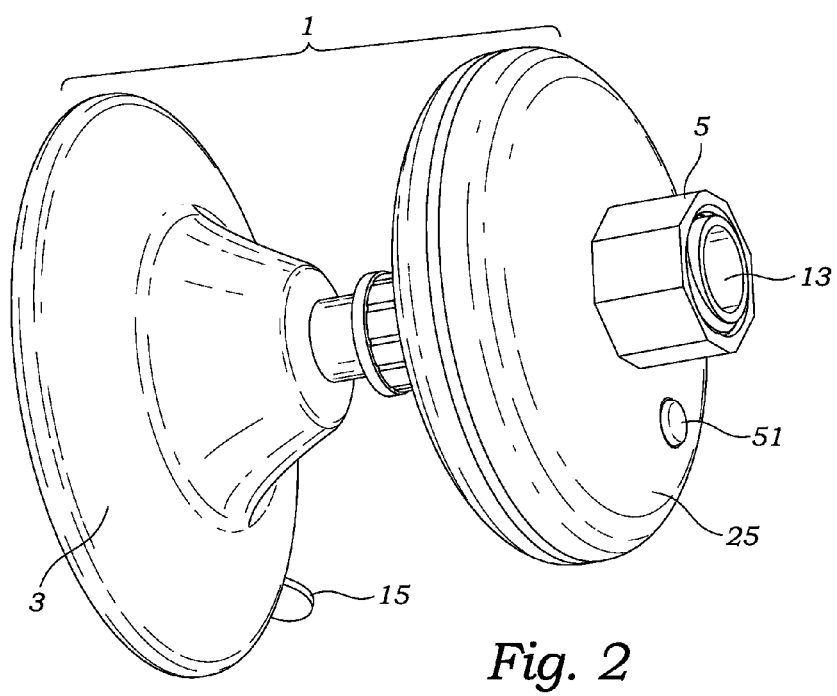
FIG. 2 is a rear perspective view of the showerhead assembly of the present invention.

The showerhead assembly's electronic controller 38 includes an electronically controlled valve 59, a processor 39, a temperature sensor 43, and a microphone 41. The processor 39 may be a general purpose computer or a microprocessor including hardware and software as can be determined by those skilled in the art so as to monitor input from the microphone 41 and temperature sensor 43, and control the opening and closing of the valve 59. The processor may be located within the electronics of a single circuit board, or within the aggregate processing of multiple circuit boards. As illustrated in FIGS. 3 and 5, a preferred showerhead assembly includes a single printed circuit board 39 including various microchips providing the appropriate processing and control required of the processor. Moreover, it is preferred that the microphone 41 be surface mounted to the printed circuit board and positioned to "hear" the ambient environment within the vicinity of the showerhead assembly. As illustrated in FIGS. 1, 4 and 5, preferably the second housing 25 includes a hole 37 positioned adjacent to the microphone 41 so that ambient noise can more readily be detected by the microphone.

The showerhead assembly's valve 59 is electronically controlled by the processor 39 to open and close the showerhead assembly's central conduit 13 so as to allow or obstruct the flow of water through the showerhead assembly to the nozzles 9. As illustrated, in a preferred embodiment, the showerhead's conduit 13 includes a channel 14 through which water is diverted to the valve 59. In addition, it is preferred that the valve 59 includes an electric motor 61 connected to a plunger 63 whereupon rotation of the motor 61 causes the plunger to project into and obstruct the conduit channel 14, or alternatively withdraw and un-obstruct the conduit channel 14.

The electronic controller assembly's temperature sensor 43 is positioned to measure the temperature of water flowing through the showerhead assembly's conduit 13. The temperature sensor 43 may be positioned adjacent to the conduit 13 so that the temperature of water is thermally conducted through the conduit, preferably made of metal, to the temperature sensor. Alternatively and preferably, the temperature sensor 43 projects through the conduit sidewall so as to make direct temperature measurements of water flowing through the showerhead assembly's conduit 13. As illustrated in FIGS. 4 and 5, the temperature sensor 43 is connected to the processor 39 by one or more wires 47.

The showerhead assembly's electronic controller 38 includes a power supply, which is preferably in the form of one or more batteries 48. The batteries are electrically conducted by electrical contacts 49 and wiring to both the processor 39 and the valve 59.

Preferably, the electronic controller 38 also includes a button 51 for transmitting signals to the processor 39. As illustrated in the figures, preferably the button is also surface mounted to the processor's printed circuit board. Also preferably, where the showerhead assembly is required to limit the flow of water through the showerhead assembly's conduit, such as required for a "low flow" showerhead, preferably the showerhead assembly has a spring 55 biased flow diaphragm 53 located within the conduit 13 adjacent to the second housing's threaded inlet 5.

The control processor 39 is connected to the temperature sensor 43 for monitoring the temperature of water flowing through the showerhead's central conduit, and the control 39 processor is connected to the microphone 41 for monitoring ambient sound. Furthermore, the processor 39 is connected to the valve 59 for controlling its operation so as to open or close the valve, or maintain the valve in an open or closed condition. In operation, the processor 39 is programmed to maintain the valve in an open condition (illustrated in FIG. 4) when a shower user first turns on the water at a water supply valve so as to supply water to the showerhead assembly's central conduit 13. The processor maintains the showerhead assembly's valve in an open condition until the water temperature reaches a predetermined temperature. The predetermined temperature may be adjusted by the shower user, or may be preprogrammed prior to distribution to a shower user. In a preferred embodiment, the predetermined temperature is 95° F. Upon the water temperature reaching this temperature, the control processor transmits signals to the valve 59 so as to close the valve (as illustrated in FIG. 5). Preferably, when the valve 59 is closed, water is permitted to trickle through the showerhead assembly so that proper temperature measurements of the water can continue.

Upon the processor determining that the water temperature has reached the predetermined temperature, the processor 39 closes the valve 59 and maintains the valve in a closed condition until receiving an audio signal from the microphone 41. The processor is programmed to filter out or disregard noises, such as dripping water, which are considered insufficient or inappropriate to be considered an audio signal from the shower user requesting that the valve be opened. In a preferred embodiment, sound above 75 decibels is sufficient to indicate that the shower user wishes for the valve to be open and the water to flow through the showerhead assembly. Even more preferably, the processor only opens the valve upon detection of a sound above 85 decibels. In addition, the processor may filter out sounds which are not intended to open the valve, such as the filtering out of conversations in the vicinity. Accordingly, the processor may filter out sounds within predetermined frequency bands or sounds longer than a predetermined period of time, such as a fraction of a second corresponding to the length of time of the sound of clapped hands. In the alternative to the audio signal, preferably the button 51 can provide this function whereupon a person pressing the button 51 indicates to the processor that the user wishes to open the showerhead assembly valve so as to commence the spray of water from the showerhead nozzles.

Preferably, the processor includes a timer (not shown) which is incorporated into the hardware (printed circuit board) and software for measuring the "duty cycle" of the shower, meaning the length of the shower. The duty cycle may be any length which has been set by the shower user or preprogrammed at the factory. However, in a preferred embodiment, the duty cycle is ten minutes. At the end of duty cycle, the processor 39 will once again close the showerhead assembly valve 59 to stop the water flow completely or reduce it to a trickle. Once closed again, an additional sound above the predetermined threshold, such as 85 decibels, or depression of the button will once again trigger the processor 39 to open the valve 59 and allow the shower to continue.

Exemplary embodiments of the present invention have been shown and described herein. Because the principles of the invention may be practiced in a number of configurations beyond those shown and described, it is to be understood that the invention is not in any way limited by the exemplary embodiments, but is generally directed to showerhead assemblies and is able to take numerous forms to do so without departing from the spirit and scope of the invention. It will also be appreciated by those skilled in the art that the present invention is not limited to the particular geometries and materials of construction disclosed, but may instead entail other functionally comparable structures or materials, now known or later developed, without departing from the spirit and scope of the invention. Furthermore, the various features of each of the above-described embodiments may be combined in any logical manner and are intended to be included within the scope of the present invention.

Groupings of alternative embodiments, elements, or steps of the present invention are not to be construed as limitations. Each group member may be referred to and claimed individually or in any combination with other group members disclosed herein. It is anticipated that one or more members of a group may be included in, or deleted from, a group for reasons of convenience and/or patentability. When any such inclusion or deletion occurs, the specification is deemed to contain the group as modified.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. At the very least, and not as an attempt to limit the application of the doctrine of equivalents to the scope of the claims, each numerical indication should at least be construed in light of the number of reported significant digits and by applying ordinary rounding techniques. Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein.

The terms "a," "an," "the" and similar referents used in the context of describing the present invention (especially in the context of the following claims) are to be construed to cover both the singular and the plural, unless otherwise indicated herein or clearly contradicted by context. All methods described herein can be performed in any suitable order unless otherwise indicated herein or otherwise clearly contradicted by context. The use of any and all examples, or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention.

Specific embodiments disclosed herein may be further limited in the claims using "consisting of" or "consisting essentially of" language. When used in the claims, whether as filed or added per amendment, the transition term "consisting of" excludes any element, step, or ingredient not specified in the claims. The transition term "consisting essentially of" limits the scope of a claim to the specified materials or steps and those that do not materially affect the basic and novel characteristic(s). Embodiments of the present invention so claimed are inherently or expressly described and enabled herein.

It should be understood that the logic code, programs, modules, processes, methods, and the order in which the respective elements of each method are performed are purely exemplary. Depending on the implementation, they may be performed in any order or in parallel, unless indicated otherwise in the present disclosure. Further, the logic code is not related, or limited to any particular programming language, and may comprise one or more modules that execute on one or more processors in a distributed, non-distributed, or multiprocessing environment.

While several particular forms of the invention have been illustrated and described, it will be apparent that various modifications can be made without departing from the spirit and scope of the invention. Therefore, it is not intended that the invention be limited except by the following claims.

The invention claimed is:

1. A showerhead assembly comprising:
a showerhead including a front face, a conduit having a proximal inlet connectable to a water source, and a plurality of distally located nozzles projecting from said front face with said nozzles connected to said conduit for receiving water from said conduit, each of said nozzles further having an outlet for expelling water from said conduit;
an electrically controlled valve within said conduit for selectively opening said conduit for permitting the flow of water through said conduit or for selectively closing said conduit for obstructing the flow of water through said conduit;
a temperature sensor thermally coupled to said conduit for producing electrical signals indicating the temperature of water within said conduit;
a microphone for producing electrical signals indicating sound in the vicinity of the showerhead assembly;
a control processor connected to said temperature sensor, said microphone and said valve, said processor connected to said temperature sensor for monitoring the temperature of water within said conduit, said processor connected to said microphone for monitoring sound in the vicinity of said showerhead assembly, and said processor connected to said valve for selectively opening and closing said valve;
said processor programmed with a predetermined temperature, said processor also programmed to control the opening and closing of said valve so that upon an initial flow of water through said conduit said valve is maintained in an open condition to permit the flow of water until said predetermined temperature is reached and upon reaching said predetermined temperature said processor automatically closes said valve, and said processor is programmed to open said valve from a closed condition to permit the flow of water through said conduit upon receiving signals from said microphone indicating that a sound above a predetermined decibel level has been detected by said microphone; and a power supply providing electrical power to said valve and processor.

2. The showerhead assembly of claim 1 wherein said processor includes a timer and said processor is programmed to close said valve after water has been flowing through said conduit for longer than a predetermined time.

3. The showerhead assembly of claim 1 further comprising:
   a first housing having a threaded inlet, said housing including said front face and said plurality of distally located nozzles projecting from said front face; and
   a second housing including said proximal inlet and said housing having a threaded outlet which threadably affixes to said first housing's threaded inlet, said second housing encapsulating said valve, said temperature sensor, said microphone, said processor and said power supply.

4. The showerhead assembly of claim 1 wherein said predetermined decibel level is 75 decibels.

5. A valve assembly comprising:
   a conduit having a threaded proximal inlet connectable to a water source, and a distal outlet;
   an electrically controlled valve within said conduit for selectively opening said conduit for permitting the flow of water through said conduit or for selectively closing said conduit for obstructing the flow of water through said conduit;
   a temperature sensor thermally coupled to said conduit for producing electrical signals indicating the temperature of water within said conduit;
   a microphone for producing electrical signals indicating sound in the vicinity of the showerhead assembly;
   a control processor connected to said temperature sensor, said microphone and said valve, said processor connected to said temperature sensor for monitoring the temperature of water within said conduit, said processor connected to said microphone for monitoring sound in the vicinity of said showerhead assembly, and said processor connected to said valve for selectively opening and closing said valve;
   said processor programmed with a predetermined temperature, said processor also programmed to control the opening and closing of said valve so that upon an initial flow of water through said conduit said valve is maintained in an open condition to permit the flow of water until said predetermined temperature is reached and upon reaching said predetermined temperature said processor automatically closes said valve, and said processor is programmed to open said valve from a closed condition to permit the flow of water through said conduit upon receiving signals from said microphone indicating that a sound above a predetermined decibel level has been detected by said microphone; and
   a power supply providing electrical power to said valve and processor.

6. The valve assembly of claim 5 wherein said processor includes a timer and said processor is programmed to close said valve after water has been flowing through said conduit for longer than a predetermined time.

7. The valve assembly of claim 5 wherein said distal outlet is threaded for connecting to a threaded coupling.

8. The valve assembly of claim 5 wherein said predetermined decibel level is 75 decibels.

* * * * *